US011003921B2

(12) United States Patent
Yoo

(10) Patent No.: US 11,003,921 B2
(45) Date of Patent: May 11, 2021

(54) APPARATUS AND METHOD FOR DISTINGUISHING FALSE TARGET IN VEHICLE AND VEHICLE INCLUDING THE SAME

(71) Applicants: Hyundai Motor Company, Seoul (KR); Kia Motors Corporation, Seoul (KR)

(72) Inventor: Min Kyun Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 16/203,839

(22) Filed: Nov. 29, 2018

(65) Prior Publication Data

US 2020/0117917 A1 Apr. 16, 2020

(30) Foreign Application Priority Data

Oct. 10, 2018 (KR) .................. 10-2018-0120326

(51) Int. Cl.
*G06K 9/00* (2006.01)
*G06T 7/70* (2017.01)
*B60R 1/00* (2006.01)

(52) U.S. Cl.
CPC ............ *G06K 9/00798* (2013.01); *B60R 1/00* (2013.01); *G06K 9/00805* (2013.01); *G06T 7/70* (2017.01); *B60R 2300/303* (2013.01); *G06T 2207/30261* (2013.01)

(58) Field of Classification Search
CPC combination set(s) only.
See application file for complete search history.

(56) References Cited

U.S. PATENT DOCUMENTS

| | | | |
|---|---|---|---|
| 2004/0178945 A1* | 9/2004 | Buchanan | G01S 13/867 342/70 |
| 2013/0322691 A1* | 12/2013 | Guan | G06K 9/00805 382/103 |
| 2013/0322743 A1* | 12/2013 | Matsunaga | G06K 9/6227 382/159 |
| 2016/0379388 A1* | 12/2016 | Rasco | G06Q 10/04 715/753 |
| 2018/0174325 A1* | 6/2018 | Fu | G01B 11/02 |
| 2019/0258878 A1* | 8/2019 | Koivisto | G05D 1/00 |
| 2019/0347497 A1* | 11/2019 | Wang | G06K 9/00818 |
| 2020/0082496 A1* | 3/2020 | Chong | G06T 3/005 |
| 2020/0184233 A1* | 6/2020 | Berberian | G06K 9/00798 |
| 2020/0242375 A1* | 7/2020 | Ogale | G06N 3/084 |
| 2020/0244891 A1* | 7/2020 | Bhuruth | H04N 5/247 |

* cited by examiner

*Primary Examiner* — Helen Zong
(74) *Attorney, Agent, or Firm* — Slater Matsil, LLP

(57) ABSTRACT

A false target distinguishing apparatus includes an image matching unit configured to match coordinate information about an acquired two-dimensional image with coordinate information about an acquired three-dimensional image, a target mapping unit configured to map sensed target information to a matching image matched with the coordinate information, a region-of-interest extraction unit configured to select a target mapped to the matching image as a region of interest and to extract the selected region of interest, and a determination unit configured to perform false target classification/learning by determining whether the extracted region of interest is a false target.

20 Claims, 8 Drawing Sheets

→ flag '0' Learning flag '0' for true target

→ flag '1' Learning flag '1' for false target

→ flag '0' Predicting flag '0' for true target

→ flag '1' Predicting flag '1' for false target

APPARATUS AND METHOD FOR DISTINGUISHING FALSE TARGET IN VEHICLE AND VEHICLE INCLUDING THE SAME

CROSS-REFERENCE TO RELATED APPLICATIONS

This application claims priority to Korean Patent Application No. 10-2018-0120326, filed on Oct. 10, 2018, which application is hereby incorporated herein by reference.

TECHNICAL FIELD

The present invention relates to an apparatus for distinguishing a false target in a vehicle.

BACKGROUND

Generally, various systems are installed in a vehicle to protect the driver and the passengers, to assist in driving and to improve ride comfort. These systems are being improved by utilizing various sensors and information communication technologies.

Among such systems, a technique of recognizing a lane using an image sensor through a camera and performing automatic steering has been put into practical use.

An image recognition/processing apparatus provided in a vehicle may detect image information about a driving lane, image information about a following vehicle, and image information about left and right lanes, and then display the image information through a display means to allow the driver to conveniently recognize lanes and to provide situation information on a road along which the vehicle travels and travel information about nearby vehicles.

Also, a sensor fusion system capable of fusing image information and radar information collected through an image sensor and a radar and extracting necessary information from the collected information has recently been developed.

The sensor fusion system is used to provide an autonomous driving system configured to recognize lane information using a camera and control automatic steering of a vehicle or a smart cruise control function of the vehicle.

However, the sensor fusion system fails to distinguish between a guard rail and a road boundary on the road, thereby generating a false target in some cases. In other cases, the sensor fusion system generates a false target due to diffuse reflection of radar electromagnetic waves. Such false targets result in erroneous control of the vehicle.

In addition, in the case of radar data, it is rarely possible to distinguish between real obstacle data and false target data and thus it is difficult to identify a false target. In addition, it is difficult to discriminate the false target based on the radar data because image processing of the radar data is impossible.

Therefore, there is a need for a false target distinguishing apparatus capable of quickly and accurately distinguishing a false target from image information about a vehicle.

SUMMARY

The present invention relates to an apparatus for distinguishing a false target in a vehicle. Particular embodiments relate to a false target distinguishing apparatus and method in a vehicle for distinguishing a false target from image information of a vehicle.

Accordingly, embodiments of the present invention are directed to an apparatus and method for distinguishing a false target in a vehicle and a vehicle including the same that substantially obviate one or more problems due to limitations and disadvantages of the related art.

Embodiments of the present invention can provide a false target distinguishing apparatus and method in a vehicle for quickly and accurately distinguishing a false target by performing false target classification/learning by extracting a region of interest by matching an image with sensor fusion for detecting a false target, and a vehicle including the same.

Embodiments of the present invention can also provide a false target distinguishing apparatus and method in a vehicle for quickly distinguishing a false target by minimizing a computation time by performing false target classification/learning based on an extracted region of interest, and a vehicle including the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

As embodied and broadly described herein, an apparatus for distinguishing a false target in a vehicle includes an image matching unit configured to match coordinate information about an acquired two-dimensional image with coordinate information about an acquired three-dimensional image. A target mapping unit is configured to map sensed target information to a matching image matched with the coordinate information. A region-of-interest extraction unit is configured to select a target mapped to the matching image as a region of interest and to extract the selected region of interest. A determination unit is configured to perform false target classification/learning by determining whether the extracted region of interest is a false target.

Herein, embodiments of the present invention may further include a size adjustment unit configured to adjust configured to check a size of the region of interest extracted by the region-of-interest extraction unit, to compare the size of the extracted region of interest with a reference size, and to adjust the size of the extracted region of interest to the reference size when the size of the extracted region of interest is different from the reference size.

In another aspect of the present invention, a method for distinguishing a false target in a false target distinguishing apparatus for a vehicle includes acquiring a two-dimensional image and a three-dimensional image, matching coordinate information about the acquired two-dimensional image with coordinate information about the acquired three-dimensional image, mapping sensed target information to a matching image matched with the coordinate information, selecting a target mapped to the matching image as a region of interest and extracting the selected region of interest, and performing false target classification/learning by determining whether the extracted region of interest is a false target.

In another aspect of the present invention, a computer-readable recording medium having recorded thereon a program for executing the false target distinguishing method for the false target distinguishing apparatus for a vehicle according to one embodiment of the present invention may perform the operations provided in the false target distinguishing method.

In another aspect of the present invention, a vehicle includes a sensor fusion apparatus configured to sense a target located near the vehicle, and a false target distinguishing apparatus communicatively coupled to the sensor fusion apparatus to match coordinate information about an acquired two-dimensional image with coordinate information about an acquired three-dimensional image and to distinguish a false target based on a matching image matched with the coordinate information, wherein the false target distinguishing apparatus includes an image matching unit configured to match coordinate information about the acquired two-dimensional image with coordinate information about the acquired three-dimensional image, a target mapping unit configured to map target information sensed by the sensor fusion apparatus to the matching image matched with the coordinate information, a region-of-interest extraction unit configured to select a target mapped to the matching image as a region of interest and to extract the selected region of interest, and a determination unit configured to perform false target classification/learning by determining whether the extracted region of interest is a false target.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
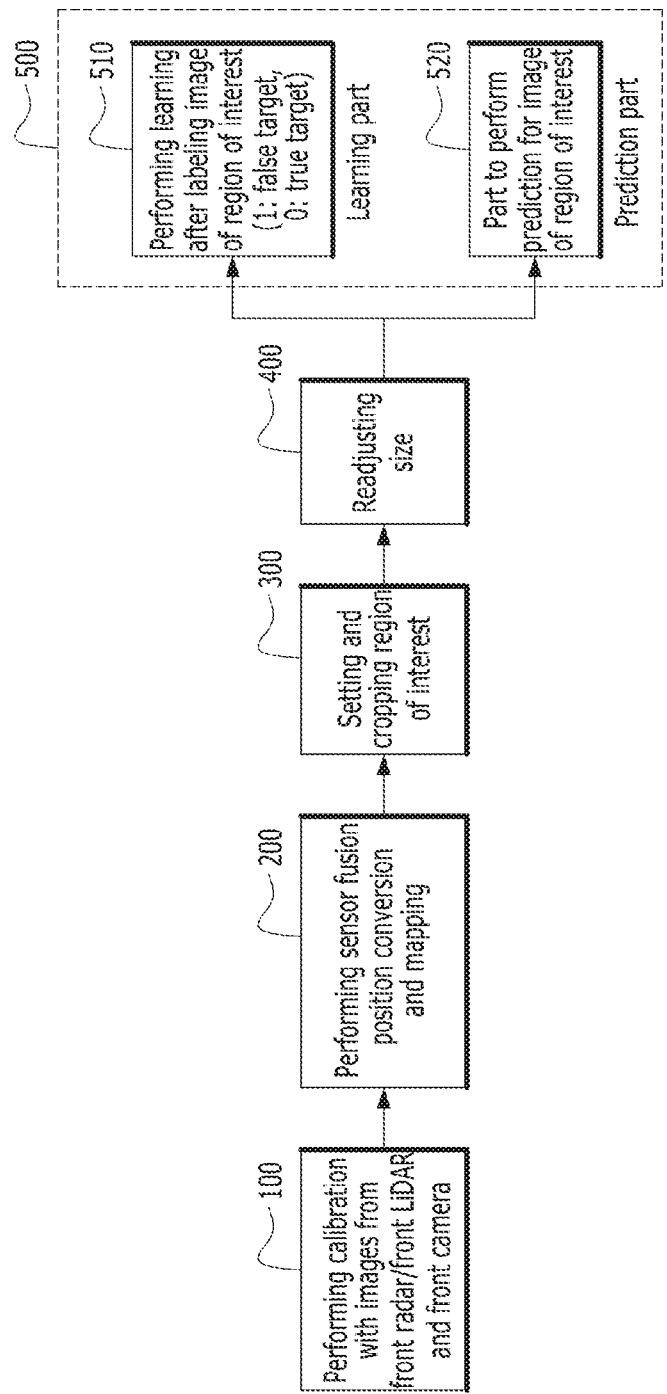
FIG. 1 is a block diagram illustrating a false target distinguishing apparatus for a vehicle according to an embodiment of the present invention.

Reference will now be made in detail to the preferred embodiments of the present invention, examples of which are illustrated in the accompanying drawings. The present invention may, however, be embodied in many different forms and should not be construed as limited to the embodiments set forth herein. In order to clearly illustrate the present invention, in the drawings, parts not related to the description are omitted, and like parts are denoted by similar reference numerals throughout the specification.

In this specification, "comprising" or "including" a component means that other components may further be included, not excluded, unless otherwise specified. The terms "unit", "-or(er)" and "module" represent at least one function or operation-processing unit that can be implemented in hardware, software, or a combination thereof.

Throughout the specification, when a part is referred to as "including" an element, it means that the part may include other elements as well, unless specifically stated otherwise. In addition, throughout the specification, parts denoted by the same reference numerals denote the same components.

Hereinafter, a detailed description will be given of a false target distinguishing apparatus and method for a vehicle to which embodiments of the present invention are applicable, and a vehicle including the same with reference to FIGS. 1 to 8.

FIG. 1 is a block diagram illustrating a false target distinguishing apparatus for a vehicle according to an embodiment of the present invention.

As shown in FIG. 1, a false target distinguishing apparatus for a vehicle of the present invention may include an image matching unit 100 configured to match coordinate information about an acquired two-dimensional image with coordinate information about a three-dimensional image, a target mapping unit 200 configured to map the sensed target information to the matching image obtained by matching of the coordinate information, a region-of-interest extraction unit 300 configured to select a target mapped to the matching image as a region of interest and to extract the selected region of interest, and a determination unit 500 configured to determine whether the extracted region of interest is a false target and to perform false target classification/learning.

In one case, the present invention may further include an image acquisition unit (not shown) configured to acquire a two-dimensional image and a three-dimensional image by sensing the surroundings of a vehicle when the vehicle travels.

In another case, the present invention may further include a size adjustment unit 400 configured to adjust the size of the extracted region of interest to a predetermined size.

The constituent parts of the false target distinguishing apparatus of the present invention will be described in more detail below.

The image acquisition unit (not shown) may include at least one camera configured to acquire a two-dimensional image and at least one radar configured to acquire a three-dimensional image.

In one case, the image acquisition unit may further include at least one LiDAR configured to acquire a three-dimensional image.

Here, the camera may be a front camera for sensing the surroundings in front of the vehicle, and the radar may be a front radar for sensing the surroundings in front of the vehicle. However, embodiments are not limited thereto.

Next, the image matching unit 100 may match the coordinate information about the acquired two-dimensional image with the coordinate information about the acquired three-dimensional image.

That is, the image matching unit 100 may convert the coordinate information about the three-dimensional image into coordinate information about a two-dimensional image, and match the converted coordinate information with the coordinate information about the two-dimensional image to generate a matching image.

Here, the image matching unit 100 may calibrate the two-dimensional image coordinate system of the front camera and the three-dimensional coordinate system of the front radar/front LiDAR through a part to perform the matching operation.

For example, the image matching unit 100 performs matching between the front camera image and the vehicle coordinate system.

Here, the matching performing part of the image matching unit 100, which is a part to move the position from the 3D image coordinate system of a real vehicle to the 2D image coordinate system, may perform matching using an intrinsic/extrinsic parameter.

The target mapping unit 200 may map the sensed target information to a matching image matched with the coordinate information.

Here, in mapping the sensed target information to the matching image, the target mapping unit 200 may map at least one of the position information, the width information, the length information, and the height information about the target.

That is, the target mapping unit 200 may extract the information based on the position, width, length, and height information about the sensor fusion target, and then map the information to the image using a matching parameter.

As described above, the target mapping unit 200 serves to perform the sensor fusion position conversion procedure. The target mapping unit may move the position of the target to an image based on the position, width, length, and height information about the sensor fusion target on which in matching has been performed.

Next, the region-of-interest extraction unit 300 may select the target mapped to the matching image as a region of interest and extract the selected region of interest.

In extracting the selected region of interest, the region-of-interest extraction unit 300 may set an extraction size of the region of interest based on the target information and extract the region of interest corresponding to the set extraction size.

Here, in setting the extraction size of the region of interest, the region-of-interest extraction unit 300 may determine the minimum size of the region of interest based on the target information and set the extraction size of the region of interest based on the determined minimum size.

The extraction size of the region of interest may be greater than the minimum size of the region of interest.

For example, the extraction size of the region of interest may be about 20% to about 40% greater than the minimum size of the region of interest, but is not limited thereto.

In addition, in extracting the selected region of interest, the region-of-interest extraction unit 300 may crop and separate the target image selected as the region of interest from the matching image.

In this way, the region-of-interest extraction unit 300 may select a region of interest from an image based on the sensor fusion target information transferred based on matching and crop the region of interest.

That is, the region-of-interest extraction unit 300 may set a region of interest based on the position, width, length, and height information about the sensor fusion target and crop the corresponding image. In consideration of readjustment of the image size, the region of interest may be cropped so as to be greater than the width, length and height of the sensor fusion target by about 30%.

In addition, since the region-of-interest extraction unit 300 crops the region of interest by mapping the result obtained from the sensor fusion target to the image, the computation time taken to search the position of the target in the existing Faster R CNN may be shortened. CNN stands for a convolutional neural network.

Here, the target search portion, which is a portion requiring the longest computation time in the existing Faster R CNN, is simplified by setting the position of the sensor fusion target as a region of interest.

The present invention may further include a size adjustment unit 400 configured to adjust the size of the extracted region of interest to a predetermined size. The size adjustment unit 400 may check the size of the region of interest extracted from the region-of-interest extraction unit 300, compare the size of the extracted region of interest with a reference size, and adjust the size of the extracted region of interest to the reference size when the size of the extracted region of interest is different from the reference size.

Here, the reference size may be the size of a square having a specific area, but is not limited thereto.

In adjusting the size of the extracted region of interest to the reference size, the size adjustment unit 400 may adjust the image area and the image shape corresponding to the extracted region of interest to an image area and an image shape corresponding to the reference size.

In one case, in adjusting the size of the extracted region of interest to the reference size, the size adjustment unit 400 may adjust the image shape corresponding to the extracted region of interest to the image shape corresponding to the reference size, and adjust the image area corresponding to the region of interest area whose image shape has been adjusted to the image area corresponding to the reference size.

In another case, in adjusting the size of the extracted region of interest to the reference size, the size adjustment unit 400 may adjust the image area corresponding to the extracted region of interest to the image area corresponding to the reference size, and adjust the image shape corresponding to the region of interest area whose image area has been adjusted to the image shape corresponding to the reference size.

In another case, in adjusting the size of the extracted region of interest to the reference size, the size adjustment unit 400 may adjust the image area and the image shape corresponding to the extracted region of interest to an image area and an image shape corresponding to the reference size at the same time.

In this way, the size adjustment unit 400 may perform resizing to adjust the image size of the cropped region of interest to a size of a square suitable for input to a classifier.

Next, the determination unit 500 may perform false target classification/learning by determining whether the extracted region of interest is a false target. The determination unit 500 may include a learning unit 510 configured to perform learning by determining whether the region of interest is a false target based on the image of the region of interest during driving, and a prediction unit 520 configured to classify the actual data through a classifier based on the extracted parameters to distinguish the false target.

Here, in determining whether the extracted interest region is a false target, the determination unit 500 may determine whether the region of interest is a false target based on pre-stored determination information.

Here, when the region of interest is determined as a false target in determining whether the extracted interest region is a false target, the determination unit 500 may label the region of interest with a false target identification number.

For example, in labeling the region of interest with a false target identification number, the determination unit 500 may label the region of interest with flag 1 as the false target identification number.

In addition, in determining whether the region of interest is a false target, the determination unit 500 may label the region of interest with a true target identification number when the region of interest is determined to be a true target.

For example, in labeling the region of interest with a true target identification number, the determination unit 500 may label the region of interest with flag 0 as the true target identification number.

In addition, in determining whether the region of interest is a false target based on the pre-stored determination information, the determination unit 500 may recognize the region of interest as a true target when the region of interest is not a false target.

In performing false target classification/learning, the determination unit 500 may determine whether the region of interest is a false target or a true target based on pre-stored determination information, and label the determined region of interest with a corresponding false target identification number or true target identification number, thereby performing false target classification/learning.

After performing false target classification/learning, the determination unit 500 may predict a false target or a true target for the extracted region of interest based on the false target classification/learning for the region of interest.

Here, in predicting a false target or a true target for the extracted region of interest, the determination unit 500 may predict the extracted region of interest before performing the false target classification/learning.

In addition, in predicting a false target or a true target for the extracted region of interest, the determination unit 500 may check whether the extracted region of interest is present before performing the false target classification/learning. When the extracted region of interest is present before the false target classification/learning, the determination unit 500 may predict a false target or a true target for the extracted region of interest based on the false target classification/learning of the region of interest, and label the predicted region of interest with a corresponding false target identification number or a true target identification number to classify the region of interest.

As such, the learning unit 510 of the determination unit 500 may label the cropped image with 0 when the cropped image is a true target, and label the cropped image with 1 when the cropped image is a false target.

Here, since the image is an image of a region of interest to which the position of the sensor fusion target is mapped, the learning unit 510 of the determination unit 500 may actually perform labeling of the image.

Then, the prediction unit 520 of the determination unit 500 may perform prediction by inputting, to the classifier, an image obtained by actually performing a procedure for a sensor fusion target leading up to an operation before learning.

Here, the prediction result may be classified as a false target or a true target.

For example, the prediction unit 520 of the determination unit 500 may determine whether the prediction result is a false target after mapping the information about the image and the sensor fusion target using the CNN.

As described above, according to the present invention, the false target may be quickly and accurately distinguished by extracting a region of interest through matching between an image and sensor fusion for detection of a false target and performing false target classification/learning.

In addition, according to the present invention, the computation time may be minimized by performing false target classification/learning based on an extracted region of interest. Thereby, a false target may be quickly distinguished.

In addition, according to the present invention, a false target generated on a guard rail or a road boundary may be efficiently removed from an existing sensor fusion target.

Further, according to the present invention, a sensor fusion false target generated by a radar/LiDAR may be determined through image processing using a convolutional neural network (CNN), and the computation time may be shortened by replacing search of a Faster R CNN portion, which requires a long computation time, with extraction of a region of interest.

Figure 2:
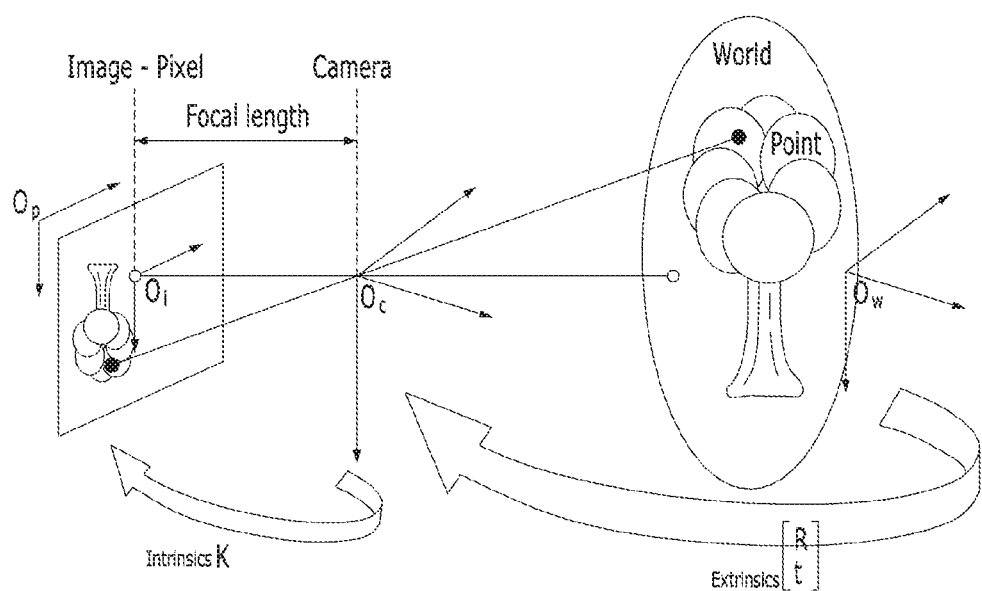
FIG. 2 illustrates a matching procedure of FIG. 1.
Figure 3:
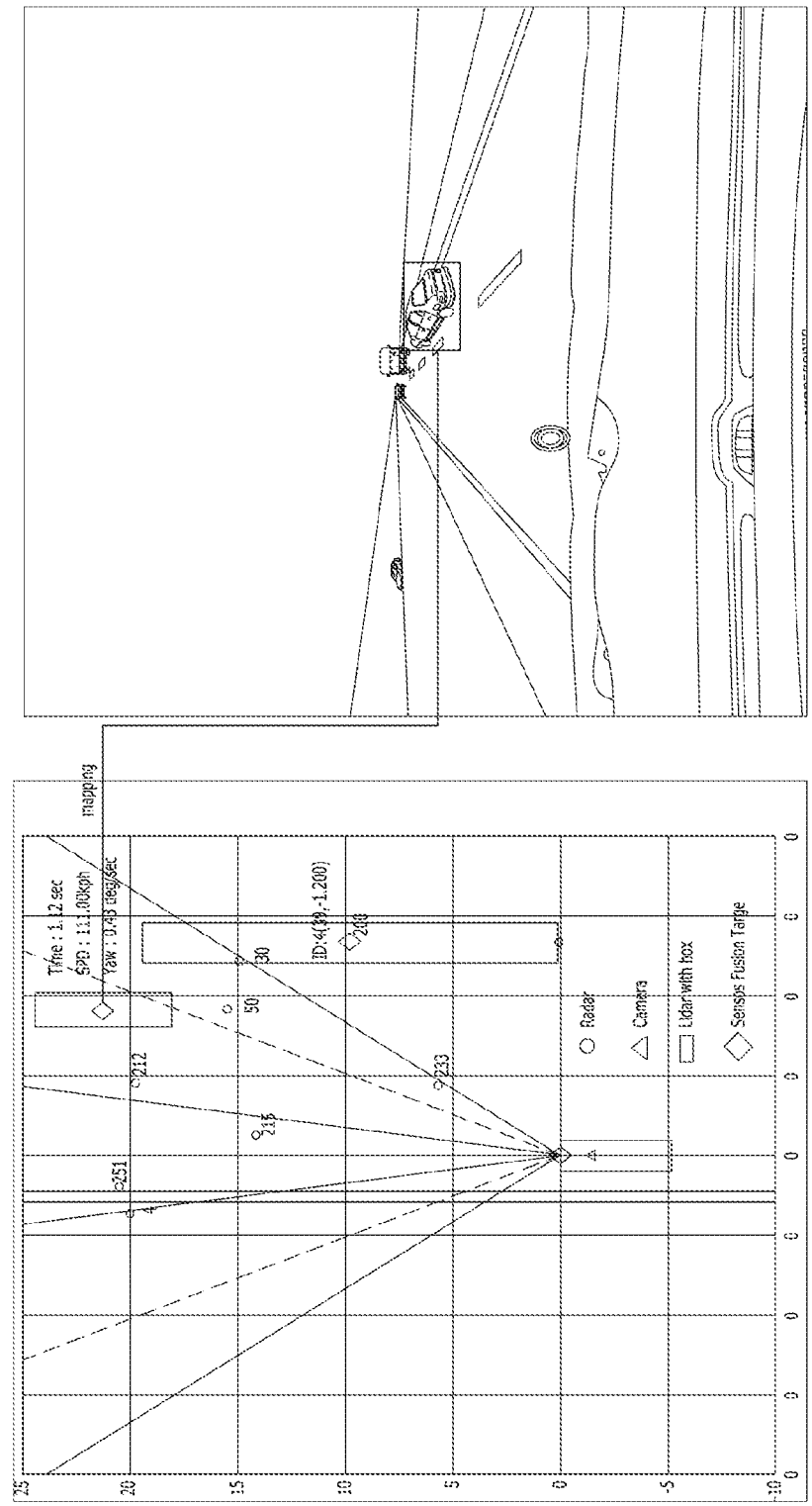
FIG. 3 illustrates a mapping procedure of FIG. 1.
Figure 4:
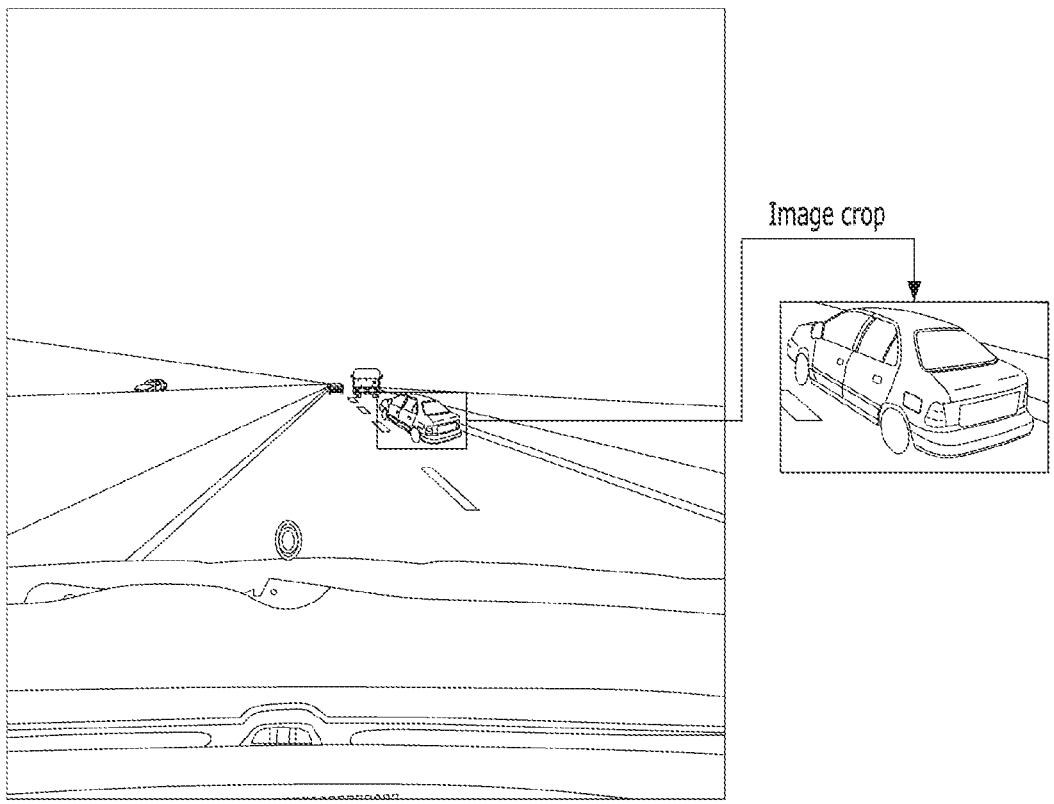
FIG. 4 illustrates a region-of-interest extraction procedure of FIG. 1.
Figure 5:
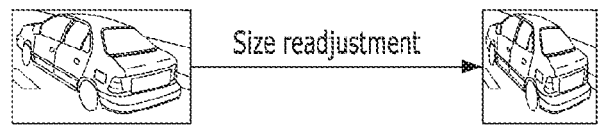
FIG. 5 illustrates an image size adjustment procedure of FIG. 1.
Figure 6:
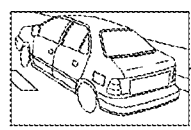
FIG. 6 illustrates a learning procedure of FIG. 1.
Figure 6:
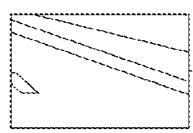
Figure 7:
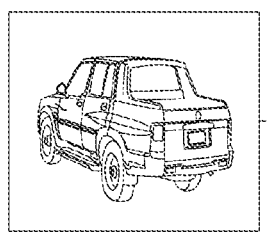
FIG. 7 illustrates a prediction procedure of FIG. 1.
Figure 7:
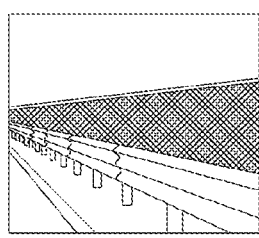
Figure 8:
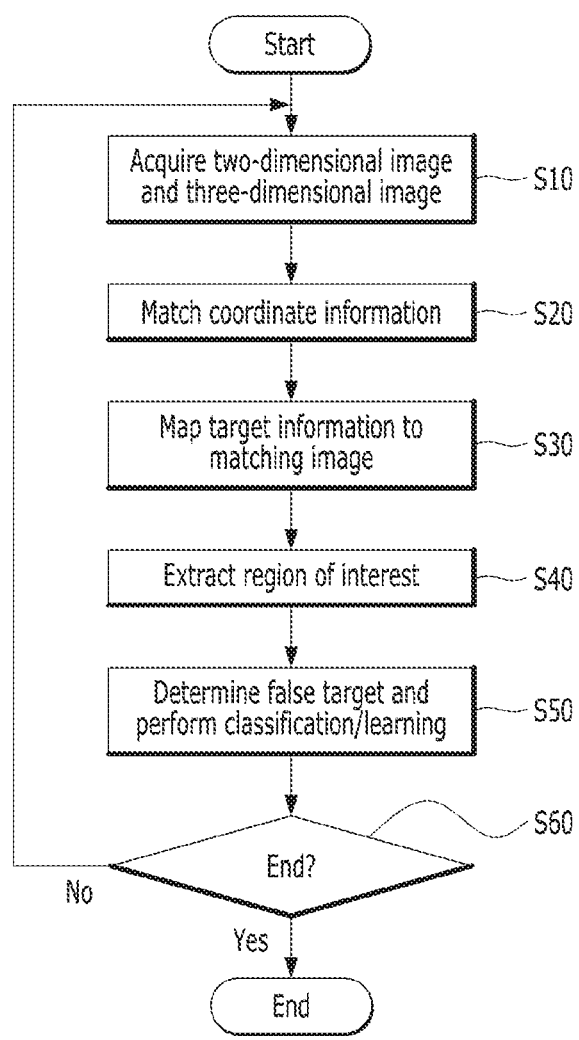
FIG. 8 is a flowchart illustrating a false target distinguishing method according to an embodiment of the present invention.

FIG. 2 illustrates a matching procedure of FIG. 1, FIG. 3 illustrates a mapping procedure of FIG. 1, and FIG. 4 illustrates a region-of-interest extraction procedure of FIG. 1. FIG. 5 illustrates an image size adjustment procedure of FIG. 1, FIG. 6 illustrates a learning procedure of FIG. 1, and FIG. 7 illustrates a prediction procedure of FIG. 1. FIG. 8 is a flowchart illustrating a false target distinguishing method according to an embodiment of the present invention.

As shown in FIG. 2, the image matching unit of the present invention may calibrate the two-dimensional image coordinate system of the front camera and the three-dimensional coordinate system of the front radar/front LiDAR through a part to perform the matching operation.

For example, the image matching unit 100 performs matching between the front camera image and the vehicle coordinate system.

Here, the matching performing part of the image matching unit 100, which is a part to move the position from the 3D image coordinate system of a real vehicle to the 2D image coordinate system, may perform matching using an intrinsic/extrinsic parameter.

In addition, as shown in FIG. 3, the target mapping unit of the present invention may map the sensed target information to a matching image matched with the coordinate information.

Here, the target mapping unit may extract the information based on the position, width, length, and height information about the sensor fusion target, and then map the information to the image using a matching parameter.

As described above, the target mapping unit 200 serves to perform the sensor fusion position conversion procedure. The target mapping unit may move the position of the target to an image based on the position, width, length, and height information about the sensor fusion sensor fusion target on which matching has been performed.

Next, as shown in FIG. 4, the region-of-interest extraction unit of the present invention may select the target mapped to the matching image as a region of interest and extract the selected region of interest.

Here, the region-of-interest extraction unit may select a region of interest from an image based on the sensor fusion target information transferred based on matching and crop the region of interest.

That is, the region-of-interest extraction unit may set a region of interest based on the position, width, length, and height information about the sensor fusion target and crop the corresponding image. In consideration of readjustment of the image size, the region of interest may be cropped so as to be greater than the width, length and height of the sensor fusion target by about 30%.

In addition, since the region-of-interest extraction unit crops the region of interest by mapping the result obtained from the sensor fusion target to the image, the computation time taken to search the position of the target in the existing Faster R CNN may be shortened.

Here, the target search portion, which is a portion requiring the longest computation time in the existing Faster R CNN, is simplified by setting the position of the sensor fusion target as a region of interest.

In addition, as shown in FIG. 5, the size adjustment unit of the present invention may check the size of the region of interest extracted from the region-of-interest extraction unit, compare the size of the extracted region of interest with a reference size, and adjust the size of the extracted region of interest to the reference size when the size of the extracted region of interest is different from a reference size.

In this way, the size adjustment unit may perform resizing to adjust the image size of the cropped region of interest to a size of a square suitable for input to a classifier.

Next, as shown in FIG. 6, the determination unit of the present invention may perform false target classification/learning by determining whether the extracted region of interest is a false target.

Here, as the learning part, the determination unit may perform learning by determining whether the region of interest is a false target based on the image of the region of interest during driving. The determination unit may label the image with 0 when the cropped image is a true target, and label the image with 1 when the cropped image is a false target.

Here, since the image is an image of a region of interest to which the position of the sensor fusion target is mapped, the determination unit may actually perform labeling of the image.

In addition, the determination unit may classify the actual data through a classifier based on the extracted parameters to distinguish the false target as a prediction unit.

In addition, as shown in FIG. 7, the determination unit may perform the prediction by inputting, to the classifier, an image obtained by actually performing a procedure for a sensor fusion target leading up to an operation before learning.

Here, the prediction result may be classified as a false target or a true target.

For example, the determination unit may determine whether the prediction result is a false target after mapping the information about the image and the sensor fusion target using the CNN.

FIG. 8 is a flowchart illustrating a false target distinguishing method according to an embodiment of the present invention.

As shown in FIG. 8, a false target distinguishing apparatus of the present invention acquires a two-dimensional image and a three-dimensional image (S10).

Here, in acquiring the two-dimensional image and the three-dimensional image, the false target distinguishing apparatus of the present invention may check whether the vehicle is travelling. When the vehicle is traveling, the false target distinguishing apparatus may acquire a two-dimensional image and a three-dimension image by sensing the surroundings of the vehicle.

Then, the false target distinguishing apparatus of the present invention may match the coordinate information about the acquired two-dimensional image with the coordinate information about the three-dimensional image (S20).

Here, in matching the coordinate information about the acquired two-dimensional image with the coordinate information about the three-dimensional image, the false target distinguishing apparatus of the present invention may convert the coordinate information about the three-dimensional image into coordinate information about a two-dimension image, and match the converted coordinate information with the coordinate information about the two-dimensional image, thereby generating a matching image.

Subsequently, the false target distinguishing apparatus of the present invention may map the sensed target information to the matching image matched with the coordinate information (S30).

Here, in mapping the sensed target information to the matching image matched with the coordinate information, the false target distinguishing apparatus of the present invention may map at least one of the position information, the width information, the length information, and the height information about the target included in the sensed target information to the matching image.

Next, the false target distinguishing apparatus of the present invention may select the target mapped to the matching image as a region of interest and extract the selected region of interest (S40).

Here, in extracting the selected region of interest, the false target distinguishing apparatus of the present invention may set an extraction size of the region of interest based on the target information and extract the region of interest corresponding to the set extraction size.

At this time, the extraction size setting of the region of interest may determine the minimum size of the region of interest based on the target information, and set the extraction size of the region of interest based on the determined minimum size.

As an example, the extraction size of the region of interest may be greater than the minimum size of the region of interest.

In addition, in extracting the selected region of interest, the false target distinguishing apparatus of the present invention may crop and separate the target image selected as the region of interest from the matching image.

Then, the false target distinguishing apparatus of the present invention may perform false target classification/learning by determining whether the extracted region of interest is a false target (S50).

Here, in performing false target classification/learning by determining whether the extracted region of interest is a false target, the false target distinguishing apparatus of the present invention may check the size of the extracted region of interest, compare the size of the extracted region of interest with a reference size, and adjust the size of the extracted region of interest to the reference size when the size of the extracted region of interest is different from a reference size. Then, the false target distinguishing apparatus may perform false target classification/learning by determining whether the region of interest having the adjusted size is a false target Here, in comparing the size of the extracted region of interest with the reference size, the false target distinguishing apparatus may perform false target classification/learning by determining whether the extracted region of interest is a false target when the size of the extracted region of interest is equal to the reference size.

For example, in adjusting the size of the extracted region of interest to the reference size, the false target distinguishing apparatus of the present invention may adjust the image area and the image shape corresponding to the extracted region of interest to an image area and an image shape corresponding to the reference size.

In one case, in adjusting the size of the extracted region of interest to the reference size, the false target distinguishing apparatus of the present invention may adjust the image shape corresponding to the extracted region of interest to the image shape corresponding to the reference size, and adjust the image area corresponding to the region of interest area whose image shape has been adjusted to the image area corresponding to the reference size.

In another case, in adjusting the size of the extracted region of interest to the reference size, the false target distinguishing apparatus of the present invention may adjust the image area corresponding to the extracted region of interest to the image area corresponding to the reference size, and adjust the image shape corresponding to the region of interest area whose image area has been adjusted to the image shape corresponding to the reference size.

In another case, in adjusting the size of the extracted region of interest to the reference size, the false target distinguishing apparatus of the present invention may adjust the image area and the image shape corresponding to the extracted region of interest to an image area and an image shape corresponding to the reference size at the same time.

Next, in performing false target classification/learning by determining whether the extracted region of interest is a false target, the false target distinguishing apparatus of the present invention may determine whether the region of interest is a false target or a true target based on pre-stored determination information, label the determined region of interest with a corresponding false target identification number or true target identification number, and perform false target classification/learning based on the labeled region of interest.

Here, in labeling the determined region of interest with a corresponding false target identification number or true target identification number, the false target distinguishing apparatus of the present invention may label the region of interest with a false target identification number when the region of interest is determined to be a false target, and may label the region of interest with a true target identification number when the region of interest is determined to be a true target.

After performing the false target classification/learning, the false target distinguishing apparatus of the present invention may predict a false target or a true target for the extracted region of interest based on the false target classification/learning for the region of interest.

Here, in predicting a false target or a true target for the extracted region of interest, the false target distinguishing apparatus of the present invention may predict the region of interest extracted before performing false target classification/learning.

In predicting a false target or a true target for the extracted region of interest, the false target distinguishing apparatus of the present invention may check whether the extracted region of interest is present before performing false target classification/learning. When the extracted region of interest is present before the false target classification/learning, the determination unit 500 may predict a false target or a true target for the extracted region of interest based on the false target classification/learning of the region of interest, and label the predicted region of interest with a corresponding false target identification number or a true target identification number to classify the region of interest.

Next, the false target distinguishing apparatus of the present invention may check whether a termination request is received and may terminate the entire procedure when the termination request is received (S60).

Additionally, the present invention may perform a procedure provided in the false target distinguishing method according to the embodiment of the present invention through a computer-readable recording medium on which a program for executing the false target distinguishing method for a false target distinguishing apparatus for a vehicle is recorded.

A vehicle according to one embodiment of the present invention may include a sensor fusion apparatus configured to sense a target positioned in the vicinity of a vehicle, and a false target distinguishing apparatus communicatively coupled to the sensor fusion apparatus to match coordinate information about an acquired two-dimensional image with coordinate information about an acquired three-dimensional image and to distinguish a false target based on a matching image obtained by matching the coordinate information, wherein the false target distinguishing apparatus may include an image matching unit configured to match the coordinate information about the acquired two-dimensional image with the coordinate information about the three-dimensional image, a target mapping unit configured to map the sensed target information to the matching image obtained by matching of the coordinate information, a region-of-interest extraction unit configured to select a target mapped to the matching image as a region of interest and to extract the selected region of interest, and a determination unit configured to determine whether the extracted region of interest is a false target and to perform false target classification/learning.

Here, the vehicle may further include an image acquisition unit configured to acquire a two-dimensional image and a three-dimensional image by sensing the surroundings of a vehicle when the vehicle travels. The image acquisition unit may be disposed in at least one of the sensor fusion apparatus and the false target distinguishing apparatus.

The sensor fusion apparatus may acquire a two-dimensional image by sensing the surroundings of the vehicle and primarily distinguish a false target based on the acquired two-dimensional image, and the false target distinguishing apparatus may secondarily distinguish a false target based on the acquired two-dimensional image and the acquired three-dimensional image.

Then, the false target distinguishing apparatus may further include a size adjustment unit 400 configured to adjust the size of the extracted region of interest to a predetermined size. The size adjustment unit may check the size of the region of interest extracted from the region-of-interest extraction unit, compare the size of the extracted region of interest with a reference size, and adjust the size of the extracted region of interest to the reference size when the size of the extracted region of interest is different from the reference size.

Next, after performing false target classification/learning, the false target distinguishing apparatus may predict a false target or a true target for a region of interest extracted before the false target classification/learning, based on the false target classification/learning for the region of interest.

As described above, according to the present invention, the false target may be quickly and accurately distinguished by extracting a region of interest through matching between an image and sensor fusion for detection of a false target and performing false target classification/learning.

In addition, according to the present invention, the computation time may be minimized by performing false target classification/learning based on an extracted region of interest. Thereby, a false target may be quickly distinguished.

In addition, according to the present invention, a false target generated on a guard rail or a road boundary may be efficiently removed from an existing sensor fusion target.

Further, according to the present invention, a sensor fusion false target generated by a radar/LiDAR may be determined through image processing using a convolutional neural network (CNN), and the computation time may be shortened by replacing search of a Faster R CNN portion, which requires a long computation time, with extraction of a region of interest.

The present invention described above may be implemented as a computer-readable code on a medium on which a program is recorded. The code can be executed on processor, such as a microprocessor. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device, and may also be implemented in the form of a carrier wave (e.g., transmission over the Internet).

As is apparent from the above description, a false target distinguishing apparatus and method in a vehicle related to at least one embodiment of the present invention configured as described above and a vehicle including the same may quickly and accurately distinguish a false target by performing false target classification/learning by extracting a region of interest by matching an image with sensor fusion for detecting a false target.

In addition, the present invention may quickly distinguish a false target by minimizing computation time by performing false target classification/learning based on an extracted region of interest.

In addition, the present invention may efficiently remove a false target generated on a guard rail or a road boundary from an existing sensor fusion target.

Further, the present invention may determine, through image processing, a sensor fusion false target generated by a radar/LiDAR using a convolutional neural network (CNN), and may shorten the computation time by replacing search of a Faster R CNN portion, which requires a long computation time, with extraction of a region of interest.

It will be appreciated by those skilled in the art that that the effects that can be achieved through the embodiments of the present invention are not limited to those described above and other effects of the present disclosure will be more clearly understood from the following detailed description.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for distinguishing a false target in a vehicle, the apparatus comprising:
   a processor; and
   a computer-readable storage medium coupled to the processor, the storage medium including code that, when executed by the processor, causes the processor to:
   calibrate a two-dimensional coordinate system about an acquired two-dimensional image with a three-dimensional coordinate system about a sensor;
   map sensed target information obtained from the sensor to a two-dimensional matching image calibrated with the three-dimensional coordinate system;
   select a target mapped to the two-dimensional matching image as a region of interest and to extract the selected region of interest, wherein the target corresponds to the sensed target information; and
   perform false target classification/learning by determining whether the extracted region of interest is a false target.

2. The apparatus according to claim 1, wherein the code, when executed by the processor, further causes the processor to acquire the two-dimensional image and the sensed target information by sensing surroundings of the vehicle when the vehicle travels.

3. The apparatus according to claim 1, wherein the code, when executed by the processor, further causes the processor to convert coordinate information about the sensed target information into coordinate information about the two-dimensional image and to match the converted coordinate information with the coordinate information about the two-dimensional image to generate the two-dimensional matching image.

4. The apparatus according to claim 1, wherein, in mapping the sensed target information to the matching image, the code causes the processor to map position information, width information, length information, or height information about the target.

5. The apparatus according to claim 1, wherein, in extracting the selected region of interest, the code causes the processor to set an extraction size of the region of interest based on the target information and to extract the region of interest corresponding to the set extraction size.

6. The apparatus according to claim 1, wherein, in extracting the selected region of interest, the code causes the processor to crop and separate the target selected as the region of interest from the matching image.

7. The apparatus according to claim 1 wherein the code, when executed by the processor, further causes the processor to adjust a size of the region of interest extracted, to compare the size of the extracted region of interest with a reference size, and to adjust the size of the extracted region of interest to the reference size when the size of the extracted region of interest is different from the reference size.

8. The apparatus according to claim 1, wherein in performing the false target classification/learning, the code causes the processor to determine whether the region of interest is a false target or a true target based on pre-stored determination information, and to label the determined region of interest with a corresponding false target identification number or true target identification number to perform the false target classification/learning.

9. The apparatus according to claim 1, wherein, after performing the false target classification/learning, the code causes the processor to predict a false target or a true target for the extracted region of interest based on the false target classification/learning for the region of interest.

10. A method for distinguishing a false target in a false target distinguishing apparatus for a vehicle, the method comprising:
   acquiring a two-dimensional image and a sensed target information;
   calibrating a two-dimensional coordinate system about the acquired two-dimensional image with a three-dimensional coordinate system about a sensor;
   mapping the sensed target information obtained from the sensor to a two-dimensional matching image calibrated with the coordinate system;
   selecting a target mapped to the two-dimensional matching image as a region of interest and extracting the selected region of interest, wherein the target corresponds to the sensed target information; and performing false target classification/learning by determining whether the extracted region of interest is a false target.

11. The method according to claim 10, wherein the acquiring of the two-dimensional image and the sensed target information comprises checking whether the vehicle travels, sensing surroundings of the vehicle when the vehicle travels to acquire the two-dimensional image and the sensed target information.

12. The method according to claim 10, wherein the calibrating comprises converting coordinate information about the sensed target information into coordinate information about the two-dimensional image and matching the converted coordinate information with the coordinate information about the two-dimensional image to generate the two-dimensional matching image.

13. The method according to claim 10, wherein mapping the sensed target information to the two-dimensional matching image comprises mapping position information, width information, length information, or height information about the target included in the sensed target information into the matching image.

14. The method according to claim 10, wherein extracting the selected region of interest comprises setting an extraction size of the region of interest based on the target information and extracting the region of interest corresponding to the set extraction size.

15. The method according to claim 10, wherein performing the false target classification/learning comprises:
checking a size of the extracted region of interest;
comparing the size of the extracted region of interest with a reference size;
adjusting the size of the extracted region of interest to the reference size when the size of the extracted region of interest is different from the reference size; and
performing the false target classification/learning by determining whether the region of interest having the adjusted size is a false target.

16. The method according to claim 15, wherein comparing the size of the extracted region of interest with the reference size comprises performing the false target classification/learning by determining whether the extracted region of interest is a false target when the size of the extracted region of interest is equal to the reference size.

17. The method according to claim 10, performing the false target classification/learning comprises:
determining whether the region of interest is a false target or a true target based on pre-stored determination information;
labeling the determined region of interest with a corresponding false target identification number or true target identification number; and
performing the false target classification/learning based on the labeled region of interest.

18. The method according to claim 17, wherein labeling the determined region of interest with the corresponding false target identification number or true target identification number comprises:
labeling the region of interest with a false target identification number when the region of interest is determined to be a false target; and
labeling the region of interest with a true target identification number when the region of interest is determined to be a true target.

19. The method according to claim 10, further comprising, when the false target classification/learning is performed, predicting a false target or a true target for the extracted region of interest based on the false target classification/learning for the region of interest.

20. A vehicle comprising:
a sensor fusion apparatus configured to sense a target located near the vehicle; and
a false target distinguishing apparatus communicatively coupled to the sensor fusion apparatus to match coordinate information about an acquired two-dimensional image with coordinate information about sensed target information obtained from the sensor fusion apparatus and to distinguish a false target based on a matching image matched with the coordinate information,
wherein the false target distinguishing apparatus comprises:
an image matching unit configured to calibrate a two-dimensional coordinate system about the acquired two-dimensional image with a three-dimensional coordinate system about a sensor of the sensor fusion apparatus;
a target mapping unit configured to map the sensed target information sensed by the sensor fusion apparatus to the two-dimensional image matched with the coordinate system;
a region-of-interest extraction unit configured to select a target mapped to the two-dimensional image as a region of interest and to extract the selected region of interest; and
a determination unit configured to perform false target classification/learning by determining whether the extracted region of interest is a false target.

* * * * *